Oct. 31, 1961   J. W. ANDERSON   3,006,016
WINDSHIELD WIPER BLADE
Filed March 7, 1958
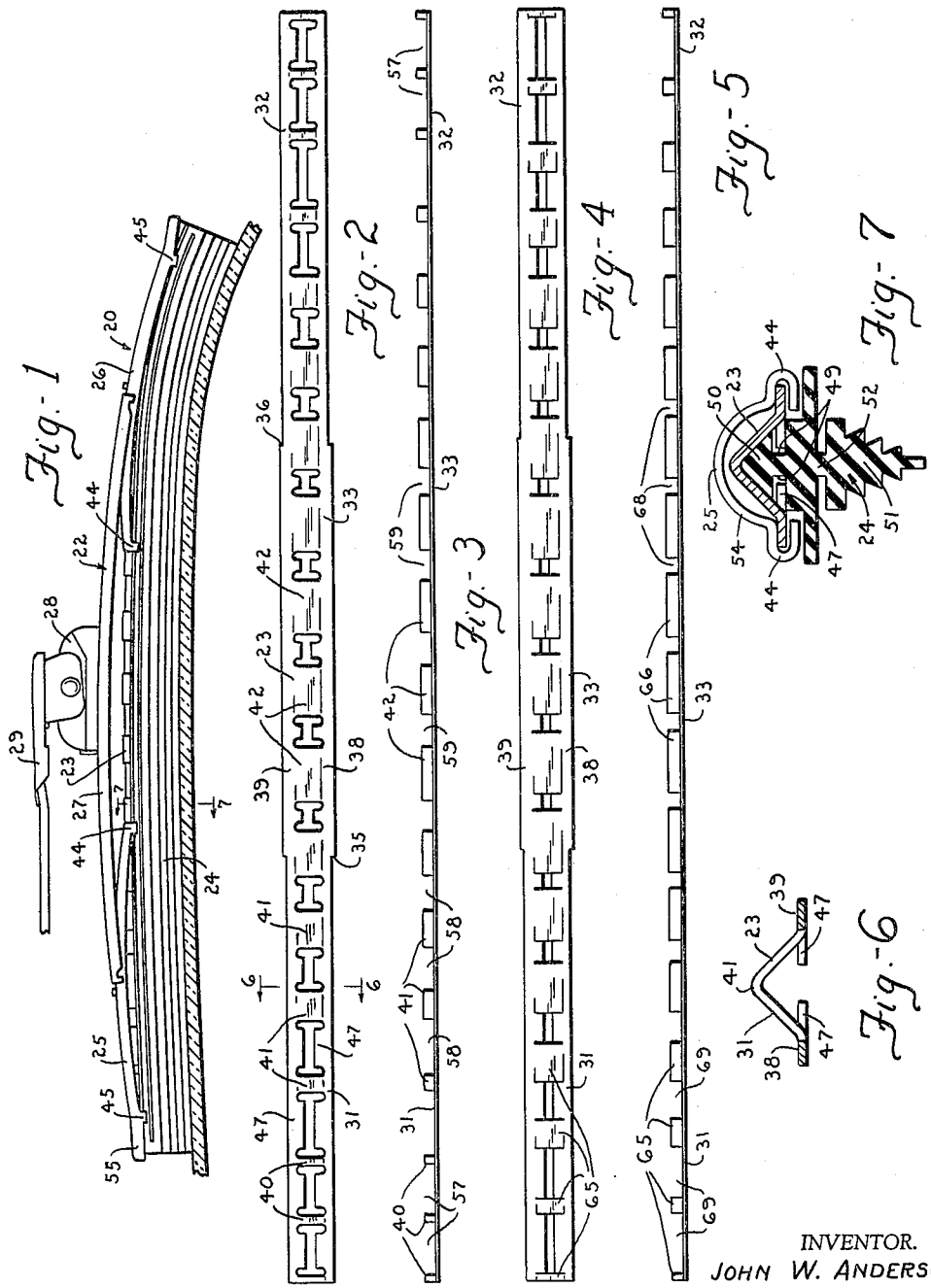
INVENTOR.
JOHN W. ANDERSON
BY
W. E. Recktenwald
ATTORNEY under# United States Patent Office 3,006,016
Patented Oct. 31, 1961

3,006,016
WINDSHIELD WIPER BLADE
John W. Anderson, 578 Broadway, Gary, Ind.
Filed Mar. 7, 1958, Ser. No. 719,969
9 Claims. (Cl. 15—250.36)

This invention relates to windshield or window wipers and more particularly to an improved wiper blade for wiping a curved surface of a wnidshield or window.

The advent of the wrap-around type of windshield, as hereinabove explained, introduced a new requirement for greater adaptability to conformity of the outboard ends of the wiper blades to the new and sharper type of curvature, preferably without departing from the principle of predetermined and proportionate distribution of pressure of the wiper arm to spaced-apart points on the flexor or "backing strip"—and thus without leaving any portion of the wiping element so deprived of pressure that it readily lifts from the glass under air currents common to normal traffic and leaves the glass unwiped in important frontal portions where vision is most necessary.

With the more extremely curved windshields it has become desirable to improve the elements of the above-referred-to patented structure to secure conformance of the blade to the windshield throughout the full wipe pattern of the blade. In order to secure this conformance of the blade to the windshield, a much greater degree of flexing of the outer end portion of the wiper blade, particularly in the vicinity of the sharply curved outboard portions of the windshield, is desirable.

In traversing an irregularly curved windshield of the latest wrap-around type, in the process of wiping it, a wiper blade progressively encounters curvatures varying in conformation throughout a wide range. The irregularity of the curvatures encountered, and the sharper outboard "drop off" of the glass from the normal longitudinal axis of the blade, are great enough to require, for effective wiping conformity of the blade to the glass, throughout the length of the blade, variations in the flexibility of the flexor which supports the blade, as affecting various longitudinal portions of the flexor. This condition was not encountered in wiping the earlier types of so-called "curved" windshield, which were less irregular in their curvatures and are being wiped successfully by blades having flexors substantially uniformly flexible.

It has been discovered that by varying gradually the flexibility of the flexor the wiping edge of the blade can more readily be kept in effective contact with the glass throughout the length of the blade.

In one flexor construction for most late-model wrap-around windshields a structure offering a predetermined maximum resistance of the flexor to flexing is carried throughout the mid-portion of the flexor, which lies between secondary yokes, and is extended in either direction therefrom a substantial distance under those yokes. The structure for reducing flexibility of the flexor continues a substantial distance toward the respective ends of the flexor, with a gradually reduced resistance to flexing until either the end of the flexor is reached or a flat flexor portion of maximum flexibility is reached near an end of the flexor where windshield curvature encountered is greatest.

It is pointed out that in manufacturing a blade which may be installed with equal convenience with one or the other end of the blade projecting outwardly, it is desirable to have the two ends of the flexor substantially identical in their resistance to flexing. However, it is possible to manufacture a blade which can only be installed with a particular one of the ends in the outward position, the inner end of the flexor may, if desired, have a greater resistance to flexing.

It is, therefore, a principal object of this invention to provide a windshield wiper blade assembly having improved flexor means whereby the wiping element responds more freely to pressure transmitted by the pressure-distributing means so that the wiping edge of the element is more readily conformed to surfaces of more widely varying degrees of curvature.

More particularly, a principal object of this invention is to provide in a windshield wiper blade assembly, a wiping element with a flexible support means having different degrees of flexibility as between different portions of the length thereof.

An important, more specific object of this invention is to provide an improved windshield wiper blade assembly in which the flexor means is more readily flexible in the areas where a greater degree of flexing is required so that greater surface conformity can be attained.

Another important object of this invention is to provide an improved wiper blade element having flexor means of varying degrees of flexibility throughout diverse portions of its length whereby the flexibility of the blade is increased at appropriate portions thereof.

A further important object of this invention is to provide an improved windshield wiper blade assembly in which the flexor means is more readily flexible in the outer part of the end portion.

Another object of this invention is to provide an improved flexor for a windshield wiper blade assembly in which the flexibility varies gradually from the less flexible intermediate portion to the more flexible outer part of the end portion.

A still further object of this invention is to provide an improved flexor or support member that is easily and readily assembled with the wiping element of a wiper blade.

And a still further object of this invention is to provide an improved wiper element that is easily assembled in or disassembled from a pressure-distributing superstructure.

Other objects and advantages of the invention will become evident when the description hereinafter set forth is considered in conjunction with the drawings annexed hereto.

In the drawings:

FIGURE 1 is a plan view of a windshield wiper blade incorporating the improved features of my invention;

FIGURE 2 is a top plan view of a form of flexor embodying my invention;

FIGURE 3 is a side view of FIGURE 2;

FIGURE 4 is a top plan view of a flexor embodying a modified form of my invention;

FIGURE 5 is a side view of FIGURE 4;

FIGURE 6 is a cross-sectional view taken on the line 6—6 of FIGURE 2; and

FIGURE 7 is a cross-sectional view taken on the line 7—7 of FIGURE 1.

Referring more particularly to FIGURES 1-3 of the drawings, the windshield wiper blade is generally designated 20 and the pressure-distributing device therefor is designated 22. The wiper blade is comprised of an elongate resiliently flexible support, backing or flexor 23 and a resilient wiping element 24 carried by the support. The pressure device is constructed in various ways, but as herein illustrated preferably includes a pair of corresponding secondary yokes 25 and 26 having their ends connected to the wiper blade, a primary yoke 27 having its ends connected to intermediate portions of the secondary yokes, and a connector 28 carried by the primary yoke for connection with a windshield wiper arm 29.

The flexor 23 is of the general type shown in U.S. Patent 2,687,544 issued August 31, 1954, and has corresponding end ports 31 and 32 and an intermediate portion 33 of a greater width than the end portions. This variation in width forms shoulders which provide longitudinally spaced abutment means 35 and 36. The flexor 23 comprises a pair of pressure-receiving side bars or rails 38, 39 and a plurality of rigid connecting bars or straps 40, 41, 42 joining the inner edges of the side bars. The straps 40, 41, 42 are shaped in such a way as to extend over the back of the rubber element 24 of the blade assembly 20 such that the longitudinally spaced claws 44, 45 of a pressure-distributing superstructure 22 engage the outer edges of the bars 38, 39 for applying pressure from the wiper arm to the wiping element. Between each pair of adjoining straps 40, 41 and 42 are inwardly extending lugs 47 which are adapted to engage in the grooves 49 extending inwardly in the sides of the rubber element 24 of the blade for holding the flexor 23 assembled therewith. Due to the character of the support or flexor, the blade is primarily adapted to flex in a plane lying substantially perpendicular to a surface of the windshield to be cleaned.

The wiping element 24 is provided with an attaching portion 50 and a wiping portion 51 which is joined to the attaching portion by an intermediate restricted portion or web 52 so as to permit tilting of the wiping portion. The attaching portion is provided with the pair of corresponding grooves 49, one being located adjacent each side of the attaching portion in a predetermined position so that they lie substantially in the same plane. The grooves 49 receive the intermarginal edge portions of the longitudinally extending lugs 47 of the flexor for holding the flexor or support 23 and element 24 assembled.

The secondary yokes 25 and 26 are preferably identical in design and construction. The inner end of the base wall of each secondary yoke is formed to provide a transverse arcuate or curved edge 54 and has the pair of corresponding ears or claws 44. The outer end of each secondary yoke is provided with a shroud-like end wall 55 which serves to conceal the ends of the support. The outer end of each of the secondary yokes 25, 26 is also provided with the pair of ears or claws 45 spaced inwardly from the end wall 55. When assembled with the blade, the longitudinally spaced pairs of ears or claws 44 and 45 of the yoke 25 extend over the reduced extremity 31 of the support or flexor 23, and the corresponding ears or claws 44 and 45 of the yoke 26 similarly extend over the extremity 32 of the support or flexor to effect a sliding action between the yokes and the support. The secondary yokes 25 and 26 are preferably assembled with the support by merely sliding the yokes inwardly along the extremities of the support until the inner ends of the yokes engage the abutment means, after which the primary yoke 27 is attached to the secondary yokes in a manner shown and described in the copending application of John W. Anderson, Serial No. 609,631, filed September 13, 1956.

It is to be understood that the invention is not intended to be limited to the above-described pressure-applying system or to the particular shouldered flexor, these elements being shown and described for illustration purposes only.

The flexible support or flexor 23 is provided with a means whereby different degrees of flexibility are introduced into the support during manufacture of the support to satisfy the particular wiping requirements of the blade with which the support is to be used. That is, on a windshield with an extreme curvature particularly on the outboard end portions thereof, it is necessary for the wiper element 24 and flexible support 23 lying substantially beneath the outwardmost portion of the secondary yoke 26 to flex or bend in the plane lying substantially perpendicular to the surface of the windshield to a much greater extent than for older-type curved windshields. By providing the flexible support 23 with a more freely flexible portion in the area where greater and more extreme flexing is required and by maintaining the balance of the flexor or support with a less degree of flexibility, a wiper blade is produced that conforms throughout its length to more severely curved surfaces of a windshield such as are encountered in wrap-around type windshields.

The straps 40, 41, 42 of the flexor are longitudinally spaced apart distances 57, 58, 59, respectively, relative to each other. For instance, the straps 40 near the ends of the end portions 31, 32 of the flexor 23 are relatively widely spaced apart as at 57 compared to the relatively narrow spacing 59 between the straps 42 in the central or intermediate portion 33 of the flexor. The straps 40, 41, 42 have a longitudinal dimension that varies from the relatively short straps 41 near the ends of the flexor to the relatively long straps 42 in the intermediate portion 87 of the flexor. In the illustrated form of flexor 23, several of the straps 40 near the ends of the flexor are of substantially the same longitudinal length and are spaced apart a substantially equal longitudinal distance 57. The next several straps 41, spaced inwardly from the ends of the flexor, are of gradually increased longitudinal length and are gradually longitudinally spaced closer together at 58 as the intermediate portion 33 of the flexor is approached. The intermediate portion 33 of the flexor 23 has substantially long straps 42 of substantially equal longitudinal length and of substantially equal longitudinal spacing 59. The spacings 59 between the straps 42 in the intermediate portion 33 are substantially less than the spacing 57 between straps 40 near the outer ends of the flexor.

The effect of the variation in lengths and spacings of the straps 40, 41, 42 on the flexor 23 is to vary the flexibility of the flexor and associated wiper element. The extreme parts of the outer end portions of the flexor 23 are relatively freely flexible in the area where the straps 40 are relatively short and are relatively widely spaced apart as at 57. As the straps 41 increase in length and are spaced closer together as at 58, the flexibility of the flexor gradually decreases. In the intermediate portion 33 of the flexor the long straps 42 and narrow spacing 59 therebetween creates a relatively less flexible portion of the blade as compared to the relatively freely flexible outer part of the end portions thereof. The long straps 41 and short spacing 59 therebetween creates a less flexible support member or flexor than the short straps 40 and wide spacing 57 therebetween, such that various combinations of long and short straps and wide and narrow spacings therebetween can be used to secure any desired degrees of flexibility at any desired longitudinal position along the length of the flexor. While each connecting bar or strip 40, 41, 42 obviously reduces the flexibility of the flexor 23 throughout the longitudinal section of the flexor across which the bar or strip extends. By making all the bars of substantially equal dimension longitudinally of the flexor, the flexor as operatively effective can be made substantially uniformly flexible throughout its length. However, by varying the distance between bars and/or by varying the dimensions of the bars longitudinally of the flexor, variations in the flexibility of various portions of the flexor can be achieved as may be desired.

The longitudinally spaced claws 44, 45 of a pressure-distributing mechanism, such as shown in FIGURE 1, will engage near the opposite ends of the end portions 31, 32 of the flexor such that the short straps 40 that are evenly spaced apart and the gradually lengthening straps 41 that are progressively different distances 58 apart will be positioned between the claws 44, 45 of each secondary yoke. Thus, the flexor between the claws of each secondary yoke varies from a relatively freely flexible part near the end portion under the outer claw 44 through a part having a gradually decreasing degree of flexibility until, in the vicinity of the inner claw of the secondary yoke, the degree of flexibility substantially equals the degree of flexibility of the substantially uniformly less flexible intermediate portion 33 of the flexor.

The nature of the flexor shown is such that all flexing of the flexor in the plane lying substantially perpendicular to the plane of the flexor takes place in the sides 38, 39 of the flexor between the longitudinally spaced straps 40, 41, 42. Each strap 40, 41, 42 in the flexor creates a substantially inflexible longitudinal portion in the immediately adjoining sides 38, 39 of the flexor, such that the flexor is made up of longitudinal portions that are alternately flexible and inflexible. When the inflexible portions are increased in length and the flexible portions are decreased in length, it becomes obvious that the flexibility of the flexor in that portion is decreased. Different degrees of flexibility are produced in the flexor and resultant blade by varying the lengths and spacing of the straps 40, 41, 42 along the length of the flexor.

FIGURES 4 and 5 show a modified form of my invention wherein straps 65, 66 are adapted to connect the side bars 38, 39 of the flexor and serve the same general function as straps 40, 41 and 42 of FIGURES 2 and 3. Straps 66 are formed in the intermediate portion 33 of the flexor and extend into an adjoining part of the respective end portions 31, 32. The straps 66 are longer than the equivalent straps 42 in FIGURE 2 and are spaced apart a short distance 68 which is much less than the spacing 59 in FIGURE 2. The effect of the reduction in widths 68 and the lengthening of the straps 66 is to decrease the flexibility of the intermediate portion even further over that shown in FIGURE 2. The end parts of the end portions 31, 32 of the flexor have the straps 65 of slightly reduced length next to the end ones of the straps 66.

Each succeeding strap 65 nearer to the end of the flexor is of reduced longitudinal length over the preceding strap and is of increased longitudinal spacing 69 relative to the preceding spacing 69. The straps 65 extend all the way to the ends of the flexor. The just-described flexor has a less degree of flexibility throughout the intermediate portion and adjoining parts of the end portions so that the inner claws 44 of the yokes of the pressure-distributing assembly engage with the less flexible portion. The remainder of the flexor is of gradually increasing flexibility which extends all the way to the end of the flexor and underneath the outer claws 45 of the yokes of the pressure-distributing assembly. The resulting flexor, when assembled with a wiper element, produces a blade which is highly flexible in the outer parts of the end portions so as to be more readily conformable to the sharply curved outboard surfaces of a windshield being wiped.

It is to be understood that the straps 40 or 65 could be of uniform length and substantially equally spaced throughout the end portions 31, 32 (from the ends of the flexor to the area in the vicinity of the inner claws 44 of the secondary yokes), while in the intermediate portion 33 the straps 42 or 66 could be longer and spaced much closer together and substantially uniformly with respect to each other, without departing from the spirit of the invention. In this just-enumerated flexor the end portions 31, 32 have greater and substantially uniform flexibility throughout the length thereof substantially underneath the secondary yokes and the intermediate portion 33 between the inner claws 44 of the respective secondary yokes would be substantially uniformly less flexible throughout the length thereof.

Having thus described my invention, it is obvious that various modifications may be made in the same without departing from the spirit of the invention, and, therefore, I do not wish to be understood as limiting myself to the exact forms, constructions, arrangements and combinations of parts herein shown and described.

I claim:

1. A flexible backing member for supporting the wiping element of a windshield wiper blade for curved windshields, said backing member being of a thickness equal to a minimum thickness required to provide the maximum of flexibility desirable for at least one longitudinal part of one portion of said backing member, and longitudinally spaced apart means of various sizes carried by another longitudinal portion of said backing member for producing a greater resistance to flexure throughout that portion of the backing member.

2. In a windshield wiper blade and in combination a resilient elongate wiping element having a wiping portion and a back portion spaced therefrom, a flexible elongate backing member extending into said back portion of said wiping element laterally from the exterior thereof for engaging coaction therewith, said backing member being flexible in a plane substantially normal to the windshield and relatively inflexible in a plane transverse thereto, said backing member having means for varying the resistance to flexing throughout the length of the backing member, said means comprising a plurality of strap means, said strap means being of a substantially uniform length and spaced apart a substantially uniform distance throughout one portion and adjoining parts of another portion of the backing member, said strap means being progressively shorter and progressively more widely spaced apart as at least one end of the blade is approached.

3. In a windshield wiper blade and in combination a resilient elongate wiping element having a wiping portion and a back portion spaced from said wiping portion, a flexible elongate backing member engaging with said back portion of said wiping element for coaction therewith, said backing member being flexible in a plane substantially normal to the windshield and relatively inflexible in a plane transverse thereto, said backing member having longitudinal portions differing respectively in the inherent resistance to flexure and comprising transversely disposed strap means extending between side bars of the backing member, at least one longitudinal portion of the backing member having the strap means relatively closely spaced together longitudinally and being of relatively large longitudinal length, and at least one part of one other longitudinal portion having strap means of progressively greater longitudinal spacing and progressively less longitudinal length as the distance from the first-mentioned longitudinal portion is increased.

4. A pressure-distributing structure for a flexible wiping means comprising resilient elongate flexor means having end portions and an intermediate portion, a plurality of transversely disposed longitudinally spaced strap means carried by said flexor means, said strap means near the opposite ends of the end portions are relatively short in longitudinal length and are relatively widely spaced apart, said strap means in the adjoining parts of the end portions are progressively longer and are progressively spaced closer together, said strap means in the intermediate portion are relatively long and closely spaced together whereby the opposite ends of the end portions are more freely flexible than the intermediate portion of the flexor.

5. A wiper for cleaning a curved surface, comprising an elongate blade flexible for conforming to the surface curvature, the blade having elongate flexible backing means, one portion of said backing means having transversely disposed means for producing one degree of flexibility in a direction normal to the curved surface and another portion of said backing means having longer and more closely spaced together transversely disposed means for producing a different degree of flexibility in the direction normal to the curved surface, a primary yoke extending lengthwise of the blade and having an arm-attaching portion, secondary yokes, one secondary yoke connected intermediate its ends to an end of the primary yoke and having at least one end connected to the first-named portion of the backing means, and another secondary yoke connected intermediate its ends to the opposite end of the primary yoke and having its opposite ends connected to the backing means at longitudinally spaced points.

6. A windshield wiper device comprising a wiper unit, said unit including an elongate resilient flexible body having a back portion and a wiping edge conformable to a surface to be wiped, a pair of transversely aligned grooves formed in the body extending substantially throughout the length thereof and positioned between said back portion and said wiping edge, elongate backing means flexible in a plane substantially perpendicular to the surface to be wiped and substantially inflexible in a plane at right angles to said first-mentioned plane, said backing means having a pair of uninterrupted longitudinally extending edges positioned in said pair of transversely aligned grooves, said backing means having transversely disposed means throughout one part thereof for producing one degree of flexibility, and having longer and closer transversely disposed means for producing a different degree of flexibility in a different part of the backing means, and means for applying pressure to said backing means to cause the wiping edge of the flexible body to conform to the surface being wiped.

7. A windshield wiper comprising a resilient wiper element, an inherently resilient metallic support for said element having a pair of side bars, longitudinally spaced-apart transverse means extending between said side bars, one portion of said support having said means of various sizes spaced closer together than another portion of said support for varying the relative flexibility of said portions, a pair of metallic pressure-distributing yokes on said support, and a bridge attachable to said yokes for joining the same to an actuating arm.

8. An elongate flexible support for an elongate resilient windshield wiper element, said support comprising a pair of longitudinally extending portions, and a plurality of means connecting said portions gradually increasing in size from at least one end of the support toward its center for varying its flexure.

9. A windshield wiper blade comprising an elongate resilient wiper element, an elongate support connected to said element for limiting movement of the blade to a single plane normal to a surface to be cleaned and having outer longitudinally extending edges, said support throughout at least a portion of its length being provided with a plurality of longitudinal spaced offset formations of different sizes disposed between said edges for varying the flexure of such portion.

References Cited in the file of this patent

UNITED STATES PATENTS

| | | |
|---|---|---|
| 2,589,339 | Carson | Mar. 18, 1952 |
| 2,687,544 | Scinta | Aug. 31, 1954 |
| 2,700,785 | Oishei et al. | Feb. 1, 1955 |
| 2,782,445 | Krohm | Feb. 26, 1957 |
| 2,814,821 | Wallis | Dec. 3, 1957 |
| 2,876,482 | Oishei | Mar. 10, 1959 |

FOREIGN PATENTS

| | | |
|---|---|---|
| F17814 II/63C | Germany | Dec. 20, 1956 |

UNITED STATES PATENT OFFICE
CERTIFICATE OF CORRECTION

Patent No. 3,006,016

October 31, 1961

John W. Anderson

It is hereby certified that error appears in the above numbered patent requiring correction and that the said Letters Patent should read as corrected below.

Column 1, lines 10 and 11, strike out ", as hereinabove explained,"; column 3, line 1, for "ports" read -- portions --; line 38, for "shroud-like" read -- shroudlike --.

Signed and sealed this 11th day of September 1962.

(SEAL)
Attest:

ERNEST W. SWIDER
Attesting Officer

DAVID L. LADD
Commissioner of Patents